A. C. SAVIDGE AND F. D. HATFIELD.
VALVE LATHE.
APPLICATION FILED JUNE 17, 1918.
1,339,791. Patented May 11, 1920.
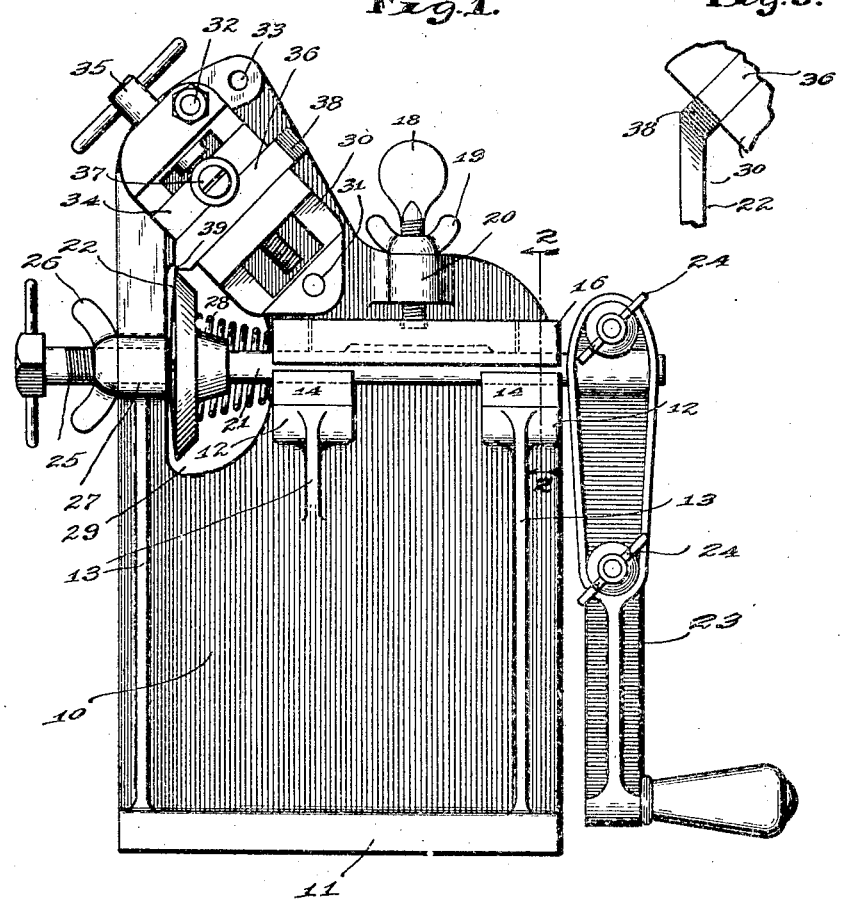
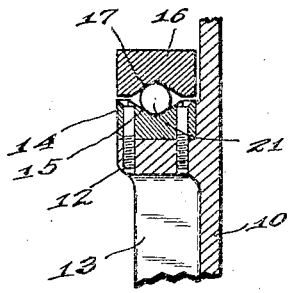
Witness
Frank A. [illegible]
Inventors
Albert C. Savidge
Frank D. Hatfield,
Hood & Ashley
Attorneys

UNITED STATES PATENT OFFICE.

ALBERT C. SAVIDGE AND FRANK D. HATFIELD, OF INDIANAPOLIS, INDIANA.

VALVE-LATHE.

1,339,791. Specification of Letters Patent. Patented May 11, 1920.

Application filed June 17, 1918. Serial No. 240,290.

*To all whom it may concern:*

Be it known that we, ALBERT C. SAVIDGE and FRANK D. HATFIELD, citizens of the United States, residing at Indianapolis, in the county of Marion and State of Indiana, have invented a new and useful Valve-Lathe, of which the following is a specification.

It is the object of our invention to provide a valve lathe, whereby valves, particularly gas engine valves, may be redressed rapidly, easily, and accurately; and to do so by a construction which is simple and inexpensive.

The accompanying drawing illustrates our invention.

Figure 1 is an elevation of a valve lathe constructed in accordance with our invention; Fig. 2 is a section on the line 2—2 of Fig. 1; and Fig. 3 is a fragmentary elevation of a part of the valve and the cutting tool, with the latter in the reverse position from that shown in Fig. 1.

Our valve lathe body comprises an upstanding plate 10 having a foot or base 11. On the front face of this plate 10 near the top are two forwardly projecting bosses 12 in part supported by strengthening ribs 13, and these bosses 12 carry bearing blocks 14 having alined V-shaped grooves 15 in their upper surface. These bearing blocks 14 are shown as non-integral with the bosses 12, but this is not essential. Opposed to these bearing blocks 14 is a single upper bearing block 16, with a longitudinal V-shaped groove 17 in its lower face. The groove 17 is deeper at the middle than at the ends, so that the bearing will be at the ends. A vertical clamping thumb screw 18 provided with a winged lock nut 19 is mounted in a forwardly projecting boss 20 from the plate 10, and the lower end of this screw 18 bears against the upper bearing block 16 at about the middle thereof, so that said bearing block 16 may be forced down with any desired pressure toward the bearing blocks 14.

The grooves 15 and 17, which are parallel to the plane of the plate 10, may receive between them the valve stem 21 of the valve 22 which is to be re-dressed, such V-shaped grooves making it possible for these bearing blocks to receive valve stems of quite widely varying size. A crank 23 is detachably fastened on the end of the valve stem 21 opposite the valve 22, being clamped thereon in any suitable manner, as by clamping thumb screws 24. By manipulation of this crank the valve and valve stem may be rotated about their axis, in the bearing blocks 14 and 16.

A valve-feeding screw 25, provided with a winged lock nut 26, is mounted horizontally in a boss 27 projecting from the front face of the plate 10 near one edge, such boss being in part supported by another strengthening rib 13. The feeding screw 25 projects through the boss 27 and into engagement with the valve 22 on the opposite face thereof from that from which the valve stem 21 projects, and as nearly as possible in line with the axis of the valve and valve stem, though if provision is made for varying sizes of valve stems exact alinement of the screw and valve stem axes is impossible save for one particular size. On account of this, the end of the screw 25 is cut off square, so that it will always engage the valve axially thereof. A compression spring 28 surrounding the valve stem 21 is provided between the valve 22 and the adjacent ends of the bearing blocks 14 and 16, and this spring holds the valve 22 against the end of the valve-feeding screw 25. Thus by manipulation of the valve-feeding screw 25, the axial position of the valve and valve stem may be adjusted. In order to have the bosses 12, 20, and 27 reasonably short, the plate 10 is cut away to provide an opening 29 opposite the valve 22 and spring 28, so as to permit such valve and spring to project through the plane of the plate.

A tool head 30 is pivotally mounted at one end on a pivot pin 31 projecting forward from the plate 10 above the bearing block 16, and at its other end is provided with a hole for receiving a clamping bolt 32 which may also project through one of two holes 33 in an upward extension of the plate 10 so as to clamp the tool head 30 in either a 45° or a 60° position with relation to the axis of the valve stem and valve, as most automobile engine valves are made at one or the other of these angles. A tool carrier 34 is slidably mounted on this tool head 30, and coöperates with an adjusting screw 35 whereby it may be slid along the tool head as desired. The tool carrier 35 is provided with a cross slot for receiving a tool 36, which is clamped in place by a clamping screw 37. One end of the tool 36 (the upper end in Fig. 1 and the lower end in Fig. 3) is provided with a cutting edge 38, for acting on the entire length of the tapered valve surface, as is clear from Fig. 3; while the other end of such tool is provided with a cutting point 39, which may be moved across the tapered valve by proper manipulation of the screw 35. For valves of harder material, and for the initial cuts on badly worn valves of any material, the cutting point 39 is preferably used; but for the finishing cut, and if desired for the entire dressing operation if the valve is not too hard and not too badly worn, the cutting edge 38 is preferably used.

By turning the crank 23, and properly manipulating the screws 25 and 35, the tapered surface of the valve 22 may be dressed quickly and accurately. Valves may readily be put in place and taken out of the lathe, by suitable manipulation of the screws 18 and 24. Thus all the valves of an automobile engine, for instance, may be quickly and accurately redressed when desired.

We claim as our invention:

1. A valve lathe, comprising a support, bearing blocks carried by said support for receiving the stem of a valve, one of said bearing blocks being adjustable, a detachable handle mountable on the valve stem for turning the valve and stem, an adjusting screw bearing against the valve for adjusting it endwise, a spring acting in opposition to said adjusting screw, and a tool carrier for supporting a tool in position to act on said valve when the valve and stem are turned by said handle and are adjusted by said screw.

2. A valve lathe, comprising a support, bearing blocks carried by said support for receiving the stem of a valve, one of said bearing blocks being adjustable, a detachable handle mountable on the valve stem for turning the valve and stem, an adjusting screw bearing against the valve for adjusting it endwise, and a tool carrier for supporting a tool in position to act on said valve when the valve and stem are turned by said hande and are adjusted by said screw, said tool carrier being angularly adjustable to a limited number of definitely pre-fixed positions.

3. A valve lathe, comprising a support arranged to receive and rotatably support the stem of a valve, a detachable handle mountable on the valve stem for turning the valve and stem, an adjusting screw bearing against the valve for adjusting it endwise, and a tool carrier for supporting a tool in position to act on said valve when the valve and stem are turned by said handle and are adjusted by said screw, said tool carrier being angularly adjustable and being movable over the working surface of the valve at an angle to the valve axis.

4. A valve lathe, comprising a support arranged to receive and rotatably support the stem of a valve, a detachable handle mountable on the valve stem for turning the valve and stem, an adjusting screw bearing against the valve for adjusting it endwise, a tool carrier for supporting a tool in position to act on said valve when the valve and stem are turned by said handle and are adjusted by said screw, and a tool head in which said tool carrier is adjustably mounted, said tool head being angularly adjustable to vary the angle of travel of said tool carrier.

5. A valve lathe, comprising a support arranged to receive and rotatably support the stem of a valve, a detachable handle mountable on the valve stem for turning the valve and stem, an adjusting screw bearing against the valve for adjusting it endwise, a spring acting in opposition to said adjusting screw, and a tool carrier for supporting a tool in position to act on said valve when the valve and stem are turned by said handle and are adjusted by said screw.

6. A valve lathe, comprising a support arranged to receive and rotatably support the stem of a valve, a detachable handle mountable on the valve stem for turning the valve and stem, an adjusting screw bearing against the valve for adjusting it endwise, and a tool carrier for supporting a tool in position to act on said valve when the valve and stem are turned by said handle and are adjusted by said screw, said tool carrier being angularly adjustable to a limited number of definitely pre-fixed positions.

In witness whereof we have hereunto set our hands at Indianapolis, Indiana, this 14th day of June, A. D. one thousand nine hundred and eighteen.

ALBERT C. SAVIDGE.
FRANK D. HATFIELD.